United States Patent
Takahashi et al.

(10) Patent No.: US 6,885,126 B2
(45) Date of Patent: Apr. 26, 2005

(54) SUPPORTING STRUCTURE FOR BRUSH MECHANISM IN MOTOR

(75) Inventors: Terumitsu Takahashi, Kosai (JP); Yoshihiro Adachi, Kosai (JP); Akira Sugiura, Kosai (JP); Yuji Yamashita, Kosai (JP); Kazutoshi Ito, Kosai (JP)

(73) Assignee: Asmo Co., Ltd., Kosai (JP)

( * ) Notice: Subject to any disclaimer, the term of this patent is extended or adjusted under 35 U.S.C. 154(b) by 387 days.

(21) Appl. No.: 10/195,297

(22) Filed: Jul. 15, 2002

(65) Prior Publication Data
US 2003/0015933 A1 Jan. 23, 2003

(30) Foreign Application Priority Data

Jul. 17, 2001 (JP) .......................................... 2001-216599
Jul. 25, 2001 (JP) .......................................... 2001-224674

(51) Int. Cl.[7] ............................................. H20K 13/00
(52) U.S. Cl. ...................... 310/239; 310/242; 310/240
(58) Field of Search ................................ 310/239, 240, 310/242

(56) References Cited

U.S. PATENT DOCUMENTS 6,329,735 B1 * 12/2001 Tanaka ........................ 310/239
6,426,575 B1 * 7/2002 Masegi ......................... 310/68
6,515,398 B1 * 2/2003 Fudono ....................... 310/239

FOREIGN PATENT DOCUMENTS

| DE | 199 54 331 A1 | 11/2000 |
| FR | 2 621 750 A3 | 4/1989 |
| FR | 2 754 952 A1 | 4/1998 |
| JP | 58-179145 A | 10/1983 |
| JP | 2000-324766 | 11/2000 |

* cited by examiner

Primary Examiner—Burton S. Mullins
Assistant Examiner—Iraj A. Mohandesi
(74) Attorney, Agent, or Firm—Crompton, Seager & Tufte, LLC

(57) ABSTRACT

A motor has a motor housing, a brush mechanism having a substrate, and a pair of electricity supply lines extending from the substrate. A first support portion, a second support portion and a third support portion are located about the central axis of the substrate. The substrate is supported by the housing with vibration absorbing members, each of which provided at one of the first to third support portions. The first support portion is located between the electricity supply lines. The second and third support portions are symmetrically located on both sides of a straight line that extends through the first support portion and the axis of the substrate. Therefore, the brush mechanism is prevented from being inclined, and vibration of the brush mechanism is effectively absorbed.

16 Claims, 5 Drawing Sheets

US 6,885,126 B2

SUPPORTING STRUCTURE FOR BRUSH MECHANISM IN MOTOR

BACKGROUND OF THE INVENTION

The present invention relates to a brush mechanism in a direct-current motor, and, more specifically, to a supporting structure for a brush mechanism.

FIG. 7 is a plan view illustrating a prior art direct-current motor. FIG. 8 is a cross-sectional view taken along line 8—8 of FIG. 7. The direct-current motor includes a brush mechanism 50. The brush mechanism includes a commutator 51, brushes 52 contacting the commutator 51, brush boxes 53 each supporting one of the brushes 52, and a substrate 54. The brush boxes 53 are fixed to the substrate 54. The substrate 54 is made of an insulating material such as resin, and is fixed to a motor housing 55. When the commutator 51 rotates, frictional force between the brushes 52 and the commutator 51 is unstable. Also, steps among the segments of the commutator 51 collide with the brushes 52. Accordingly, the brushes 52 generate self-excited vibration. The vibration is transmitted to the motor housing 55 through the substrate 54. The vibration is further transmitted to a motor yoke 56, which produces noise from the motor yoke 56.

In a motor used in a vehicle, such as a motor in an electric power steering, the substrate 54 is supported by the motor housing 55 with a rubber vibration absorbing member 57. This structure prevents vibration from being transmitted from the brushes 52 to the motor housing 55. As shown in FIG. 8 and 10, the substrate 54 is fixed to the motor hosing 55 with the two vibration absorbing members 57 and screws 58, which are located at positions K4, K5, respectively.

However, as shown in FIGS. 7 and 9, the positions K4, K5 are on a line L0 (the diameter line of the substrate 54), which is perpendicular to the central axis of the substrate 54. That is, the positions K4, K5 are spaced by 180° about the central axis of the substrate 54. Also, the position K4 is located between two terminals 60. Each terminal 60 is connected to a lead wire 59 for supplying electricity to one of the brushes 52. The terminals 60 are fixed to the substrate with the position K4 in between.

When an external force is applied to the lead wires 59, the force is transmitted to the substrate 54 through the terminals 60. Especially, when the load received by one of the lead wires 59 is greater than the load received by the other lead wire 59, the external force rotate (incline) the substrate 54 about the line L0, on which the positions K4, K5 are located. Therefore, the brushes 52, which are fixed to the substrate 54, are inclined with respect to the motor housing 55, which changes the contacting state of the brushes 52 and the commutator 51. This adversely affects the rectification of the motor and causes the motor to rotate at a nonuniform rotational speed. Further, it is difficult to effectively absorb vibration of the substrate 54 produced by external force at the only two positions K4, K5.

SUMMARY OF THE INVENTION

Accordingly, it is an objective of the present invention to provide a supporting structure for a brush mechanism in a motor, which structure prevents the brush mechanism from being inclined and effectively absorbs vibration of the brush mechanism.

To achieve the foregoing and other objectives and in accordance with the purpose of the present invention, a supporting structure for brush mechanism in a motor is provided. The brush mechanism includes a substrate. The substrate has a central axis and a plurality of support portions located about the central axis. The substrate is supported by a housing of the motor with elastic members, each of which is provided at one of the support portions. A pair of electricity supply lines extend from the substrate. The support portions include first, second and third support portions. The first support portion is located between the electricity supply lines. The second and third support portions are respectively located on both sides of a straight line that extends through the first support portion and the central axis of the substrate.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4($b$) is a cross-sectional plan view illustrating one of the floating support portions of FIG. 4($a$);

FIG. 5($b$) is a cross-sectional plan view illustrating one of the floating support portions of FIG. 5($a$);

DETAILED DESCRIPTION OF THE PREFERRED EMBODIMENTS

A first embodiment of the present invention will now be described with reference to FIGS. 1 to 3.

Figure 1:
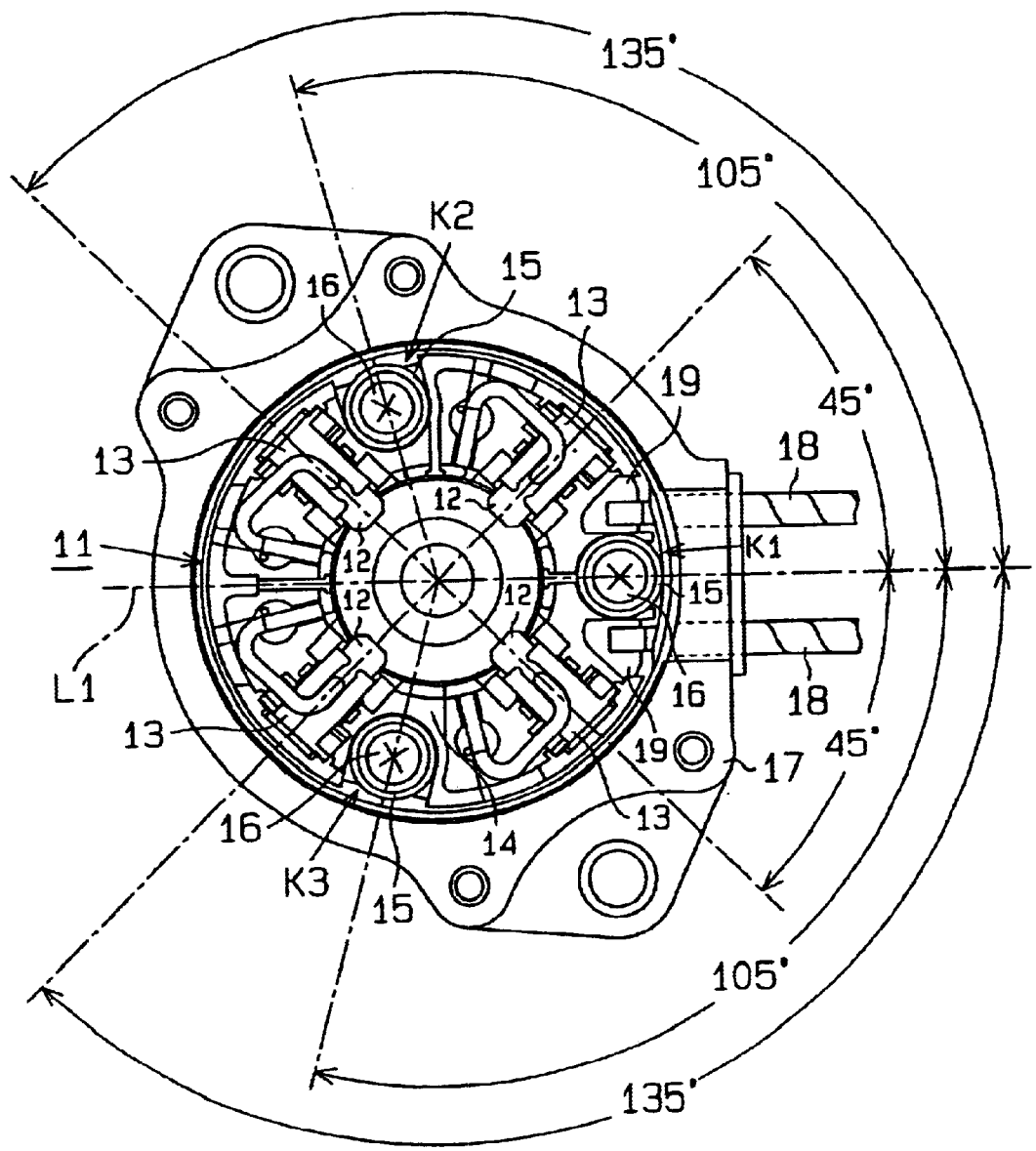
FIG. 1 is a plan view illustrating a motor according to a first embodiment of the present invention.
Figure 2:
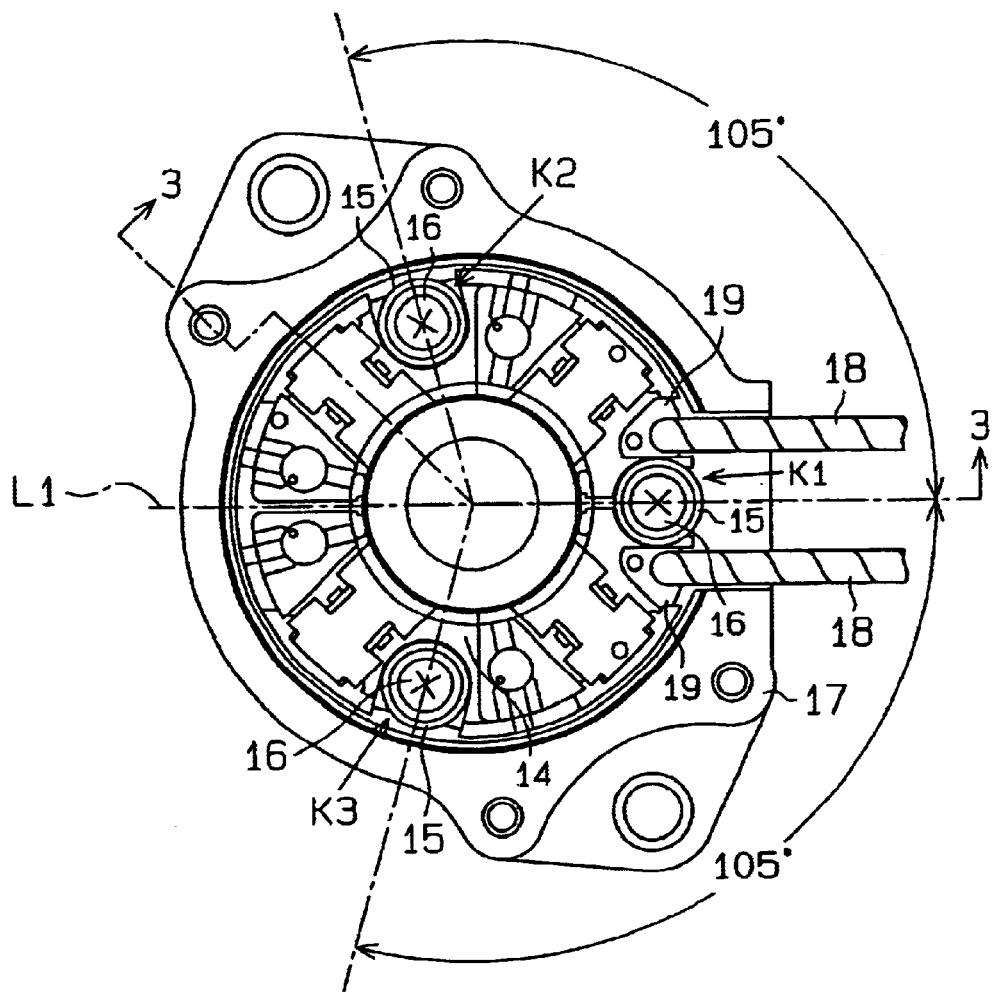
FIG. 2 is a plan view showing the motor of FIG. 1, from which the brushes and brush boxes are removed.
Figure 3:
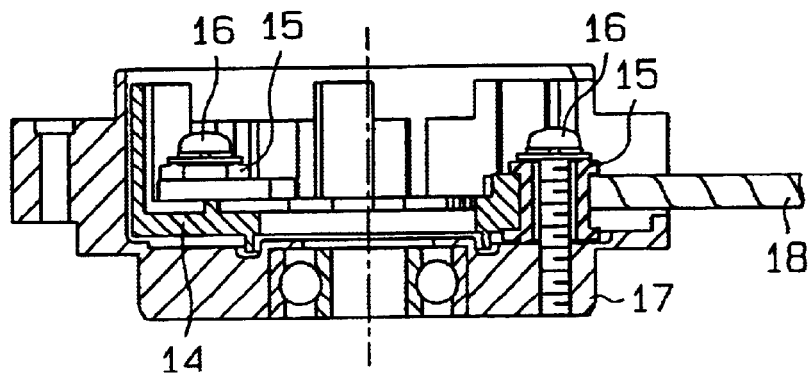
FIG. 3 is a cross-sectional view taken along line 3—3 in FIG. 2.

As shown in FIGS. 1 to 3, a brush mechanism 11 of a motor includes brushes 12, brush boxes 13 and a substrate 14. The brushes 12, the number of which is four in this embodiment, contact a commutator (not shown) of the motor. Each of the brush boxes 13, the number of which is four in this embodiment, holds one of the brushes 12. The brush boxes 13 are fixed to the substrate 14. The substrate 14 is formed with insulating material made of resin. Elastic vibration absorbing members are located at predetermined fixing positions K1, K2, K3. In this embodiment, the absorbing members are cylindrical rubbers 15. The substrate 14 is supported by the motor housing 17 with fixing members located at the three fixing positions K1, K2, K3. The fixing members are screws 16 in this embodiment. The cylindrical rubbers 15 are located between the screws 16 and the substrate 14 so that the substrate 14 floats.

The first fixing position K1, which is a first floating support portion, is located between two terminals 19. Two external electricity supply lines, which are lead wires 18, are connected to the terminals 19. Specifically, each lead wire 18 is connected to one of the terminals 19. The terminals 19 are fixed to the substrate 14. The second fixing position K2, which is a second floating support portion, and the third fixing position K3, which is a third floating support portion, are located on the sides of a line (the diameter line of the substrate 14) L1 that includes the central axis of the first fixing position K1 and the central axis of the substrate 14. The fixing positions K2, K3 are symmetrical with respect to the line L1 and are equally spaced from the central axis of the substrate 14. As shown in FIGS. 1 and 2, the second and third fixing points K2, K3 are angularly spaced from the first fixing position by 105° about the central axis of the substrate 14.

The brush boxes 13 holding the brushes 12 are arranged in the following manner. As shown in FIG. 1, two of the brush boxes 13 are located on both sides of the diameter line L1 and are angularly spaced from the first fixing position K1 by 45°. The other two brush boxes 13 are also located on both sides of the diameter line L1 but are angularly spaced from the first fixing position K1 by 135°. Accordingly, the brushes 12 are angularly spaced by 90° intervals about the central axis of the substrate 14.

The above embodiment has the following characteristics.

The first fixing position K1 is located between the two lead wires 18 fixed to the substrate 14. The second and third fixing positions K2, K3 are located on the sides of the diameter line L1, which contains the center of the first fixing position K1 and the central axis of the substrate 14. Therefore, external force applied from the lead wires 18 to the sides of the first fixing position K1 is received by the second and third fixing positions K2, K3, which prevents the substrate 14 from being rotated (inclined) about the diameter line L1. As a result, the contacting state of the brushes 12 and the commutator is not changed due to inclination of the substrate 14, which permits the motor to rotate at an even rate.

The substrate 14 is supported by the motor housing 17 in a floating manner at the three fixing positions K1 to K3. Therefore, compared to the prior art supporting structure, in which the substrate is supported at two fixing positions on the same line perpendicular to the central axis of the substrate, vibration of the brush mechanism 11 is effectively absorbed by the fixing positions K1 to K3.

The second and third fixing positions K2, K3 are located on the sides of the diameter line L1 and are angularly spaced from the first fixing position K1 by 105° about the central axis of the substrate. Since the second and third fixing positions K2, K3 are symmetrical with respect to the diameter line L1, force applied to the sides of the first fixing position K1 from the lead wires 18 is equally received by the second and third fixing positions K2, K3.

The second and third fixing positions K2, K3 are angularly spaced from the first fixing position K1 by 120° about the central axis of the substrate 14. Compared to a case in which the three fixing positions K1 to K3 are angularly spaced by equal angular intervals, the second and third fixing positions K2, K3 of the above embodiment is closer to the first fixing position K1. Therefore, external force applied to the sides of the first fixing position K1 from the lead wires 18 is effectively received.

Each of the second and third fixing positions K2, K3 forms an angle that is greater than 90° with the first fixing position K1 about the central axis of the substrate 14. This structure does not degrade the vibration absorbing performance of the brush mechanism 11 due to insufficient distance between the second and third fixing positions K2, K3 and the first fixing position K1.

Two of the brush boxes 13 are located on both sides of the diameter line L1 and are angularly spaced from the first fixing position K1 by 45°. The other two brush boxes 13 are also located on both sides of the diameter line L1 and are angularly spaced from the first fixing position K1 by 135°.

The second and third fixing positions K2, K3 are angularly spaced from the first fixing position K1 by angles no less than 90° and no more than 120° about the central axis of the substrate 14. Any one of the brush boxes 13 forms an angle less than 45° with at least one of the adjacent fixing positions. Vibration of each brush 12 is effectively absorbed by the closest fixing position (K1 to K3). As a result, the vibration of the brush mechanism 11 is effectively absorbed.

A second embodiment of the present invention will now be described with reference to FIGS. 4(a) and 4(b). The differences from the embodiment of FIGS. 1 to 3 will mainly be discussed. The structure other than the floating support portions is the same as the first embodiment. Therefore, FIGS. 1 to 3 should be referred as necessary.

Figure 4A:
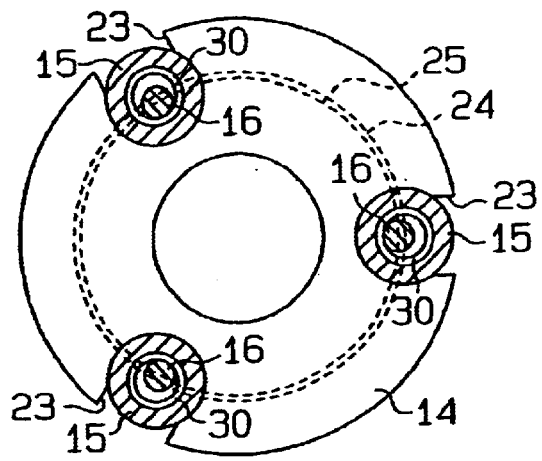
FIG. 4($a$) is a cross-sectional plan view illustrating a floating support portions according to a second embodiment of the present invention.

As shown in FIG. 4(a), first to third fixing positions K1 to K3 are arranged about the central axis of the substrate 14 with equal angular intervals in this embodiment. U-shaped notches 23 are formed in the peripheral portion of the substrate 14. The positions of the notches 23 correspond to the fixing positions K1 to K3. Each notch 23 receives one of the vibration absorbing cylindrical rubbers 15. The notches 23 are formed such that the axes of the cylindrical rubbers 15 are equally spaced from the center of the substrate 14, or from the center of the commutator. In other words, the cylindrical rubbers 15 are located on a first circle 24, the center of which coincides with the central axis of the commutator.

A cylindrical metal collar 30 is fitted in each cylindrical rubber 15. When the substrate 14 is attached to the motor housing 17, each screw 16 is inserted in one of the collars 30 and is threaded to the motor housing 17. Each collar 30, which functions as a limiting member, limits the threaded amount of the corresponding screw 16 to the motor housing 17. The threaded amount of each screw 16 to the motor housing 17 is determined in accordance with the axial dimension of each collar 30. Accordingly, the screws 16 clamp the cylindrical rubbers 15 against the substrate 14 in the axial direction with uniform loads. The outer surface of each collar 30 evenly contacts the inner surface of the corresponding cylindrical rubber 15. The axial dimension of the collars 30 is substantially equal to that of the cylindrical rubbers 15.

The screws 16 are attached to the motor housing 17 such that axes of the screw 16 are equally spaced from the central axis of the substrate 14 (the central axis of the commutator). Threaded holes for receiving the screws 16 are formed in the motor housing 17. The screw receiving holes are located on a second circle 25, the center of which coincides with the central axis of the commutator (see FIG. 4(a)). The diameter of the second circle 25 is smaller than that of the first circle 24.

Figure 4B:
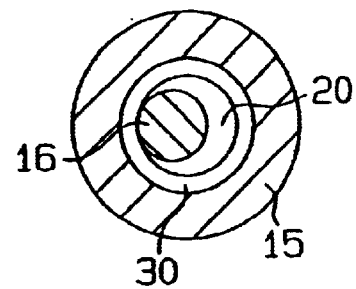

As shown in FIG. 4(b), the diameter of each screw 16 is smaller than the inner diameter of the collar 30. A space 20 is thus created between the inner surface of each collar 30 and the outer surface of the screw 16.

The diameter of the first circle 24, the diameter of the second circle 25, and the outer diameter of each screw 16, and the inner diameter of each collar 30 are determined such that each cylindrical rubber 15 is pressed radially inward with respect to the substrate 14 when the screws 16 are threaded to the threaded holes in the motor housing 17. That is, when each screw 16 is threaded to the corresponding threaded hole in the motor housing 17, the screw 16 presses the inner surface of the corresponding collar 30 radially inward with respect to the substrate 14, which presses the cylindrical rubber 15 against the notch 23. The cylindrical rubber 15 is thus deformed. As a result, each cylindrical rubber 15 urges the substrate 14 radially inward. The diameter of the first circle 24 is shorter after the substrate 14 is attached to the motor housing 17 than before the substrate 14 is attached to the motor housing 17. Specifically, the diameter of the first circle 24 is shortened by the compressed amount of the cylindrical rubbers 15.

The diameters of the first and second circles 24, 25 are determined such that the space 20 (half the difference between the inner diameter of each collar 30 and the diameter of the corresponding screw 16) is less than the compression amount of each elastic member 15. As a result, when the substrate 14 is attached to the motor housing 17, the cylindrical rubbers 15 are constantly compressed and urge the substrate 14 radially inward as described above.

The three cylindrical rubbers 15 are substantially equally spaced from one another along the circumferential direction. The urging force of the cylindrical rubbers 15 are all directed radially inward with respect to the substrate 14. Therefore, the substrate 14 receives equal urging forces from the three cylindrical rubbers 15. This holds the substrate 14 at a position where the compression amount of the cylindrical rubbers 15 are equalized in the radial direction. This structure holds the substrate 14 such that the central axis of the brush mechanism 11 coincides with the central axis the rotor of the motor.

The collars 30 substantially equalizes the threaded amount of the screws 16 at all the fixing positions K1 to K3. Therefore, all the cylindrical rubbers 15 are held between the screws 16 and the motor housing 17 by substantially equal axial loads. Accordingly, the urging forces of the cylindrical rubbers 15 are substantially equalized.

As described above, the substrate 14 is held such that the brush mechanism 11 is coaxial with the rotor. Therefore, the brushes 12 adequately contact the commutator, which guarantees a stable motor output. Also, vibration and noise due to displacement of the axes are reduced.

In the second embodiment, the cylindrical rubbers 15, each of which is provided about the corresponding collar 30, urge the brush mechanism 11 in the radial direction. However, the brush mechanism 11 may be urged in the radial direction a structure according to a third embodiment, which is shown in FIGS. 5(a) to 6.

Figure 5A:
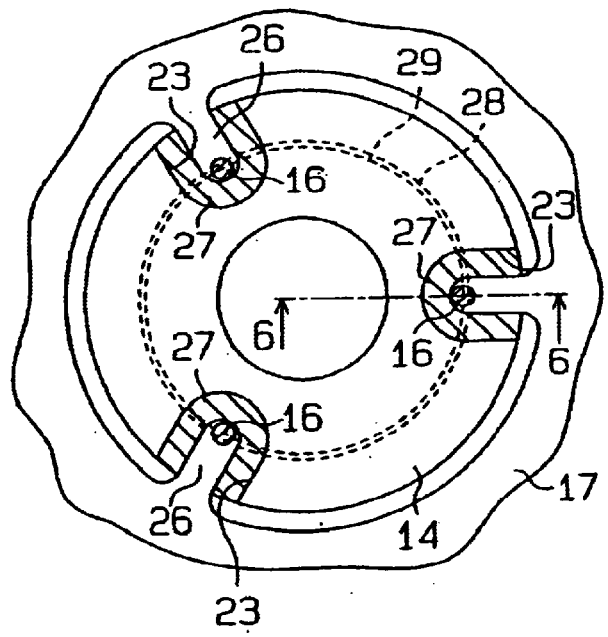
FIG. 5($a$) is a cross-sectional plan view illustrating a floating support portion according to a third embodiment of the present invention.
Figure 5B:
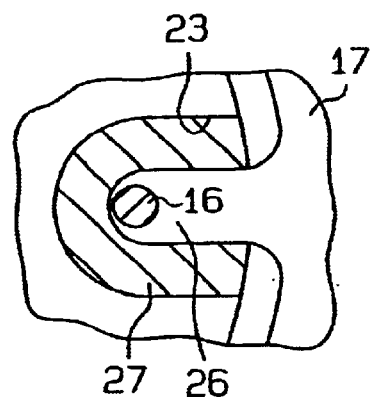
Figure 6:
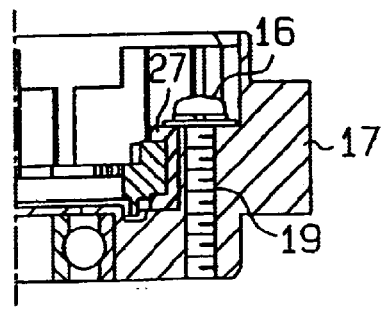
FIG. 6 is a cross-sectional view taken along line 6—6 of FIG. 5($a$)
Figure 7:
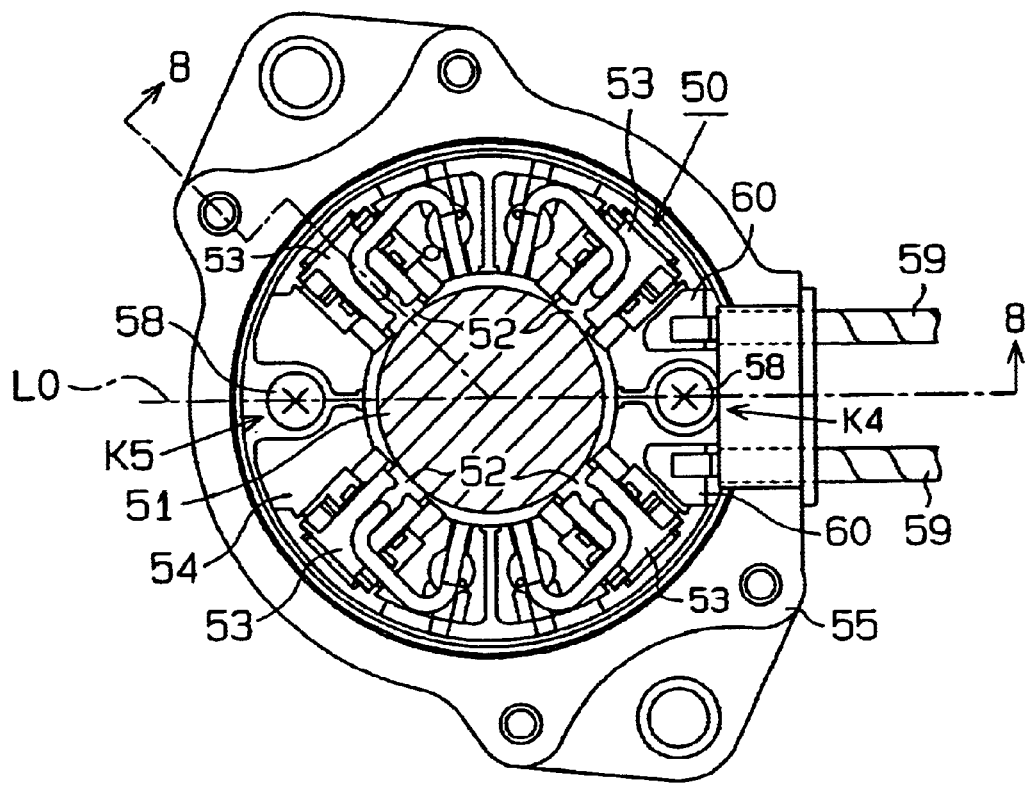
FIG. 7 is a plan view illustrating a prior art motor.
Figure 8:
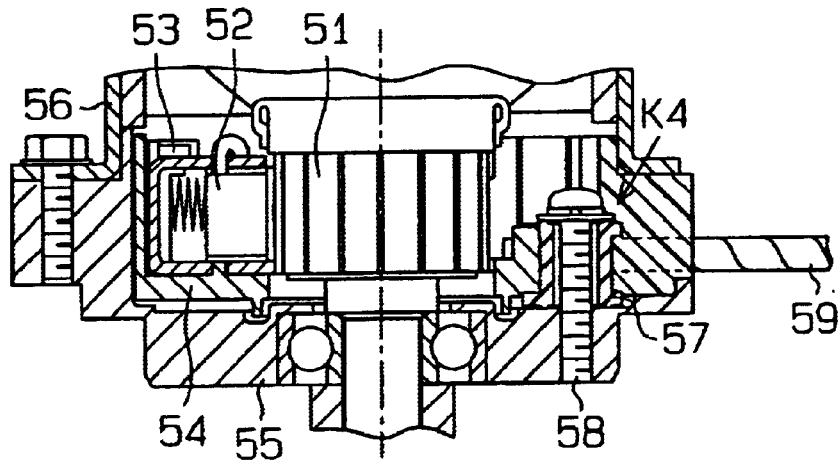
FIG. 8 is a cross-sectional view taken along line 8—8 in FIG. 7.
Figure 9:
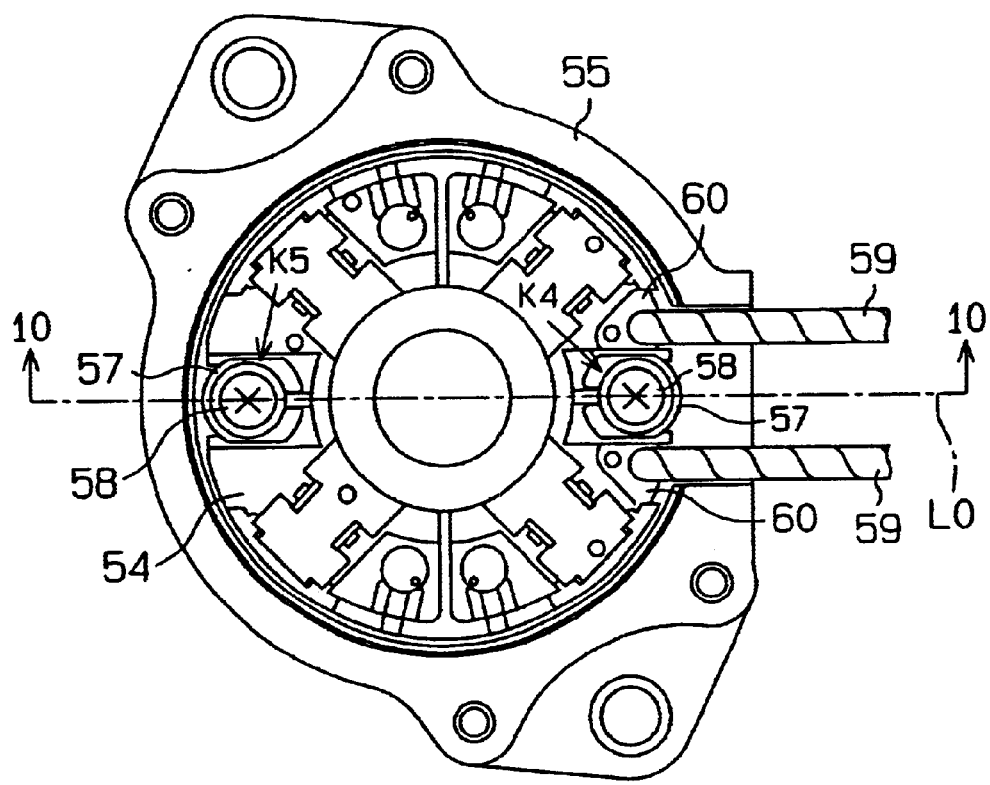
FIG. 9 is a plan view showing the motor of FIG. 7, from which the brushes and brush boxes are removed.
Figure 10:
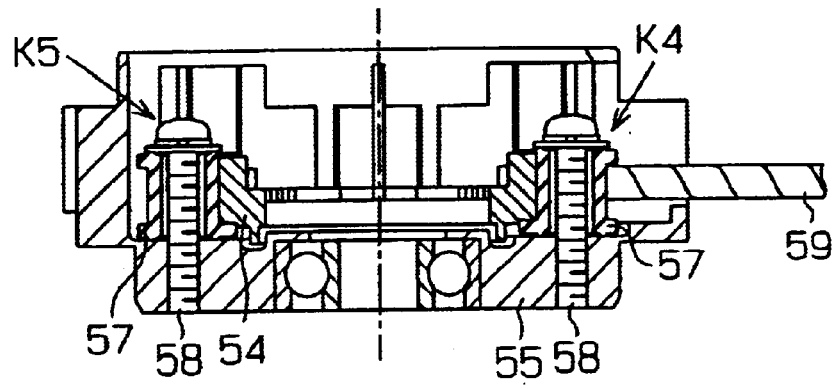
FIG. 10 is a cross-sectional view taken along line 10—10 of FIG. 9.

As shown in FIGS. 5(a), 5(b) and 6, the motor housing 17 has projections 26 into which the screws 16 are threaded. A vibration absorbing U-shaped rubber 27 is located about each projection 26. Each projection 26 projects from the motor housing 17 toward the central axis of the motor housing 17. Each screw 16 is threaded to the center of the distal portion of each projection 26. The screws 16 hold the U-shaped rubbers 27 in the axial direction of the substrate 14 so that the U-shaped rubbers 27 exert a constant urging force in the radial direction. The notches 23 of the substrate 14 are formed such that the centers of the arcuate surfaces of the U-shaped rubbers 27 are equally spaced from the central axis of the substrate 14, or from the central axis of the commutator. That is, the centers of the arcuate surfaces of the U-shaped rubbers 27 are located on a first circle 28 at substantially equal angular intervals.

The centers of the distal arcuate surfaces of the projections 26 are equally spaced from the central axis of the motor housing 17, or from the central axis of the commutator. That is, the centers of the distal arcuate surfaces of the projections 26 are located on a second circle 29 the center of which coincides with the central axis of the commutator. The diameter of the second circle 29 is smaller than that of the first circle 28. The diameter of the first circle 28 and the diameter of the second circle 29 are determined such that the compressed amount of the U-shaped rubbers 27 is more than the difference between the radius of the first circle 28 and the radius of the second circle 29. As a result, the U-shaped rubbers 27 are always compressed, and the urging forces applied to the substrate 14 by the U-shaped rubbers 27 are directed to the central axis of the motor housing 17 and equalized. This structure holds the substrate 14 such that the central axis of the brush mechanism 11 coincides with the central axis of the rotor.

This embodiment provides the same advantages as the embodiment shown in FIGS. 4(a) to 4(b). In addition, the threaded amount of the screws 16 is limited by the projections 26 of the motor housing 17 in this embodiment. This structure eliminates the necessity for collars and thus reduces the number of the parts.

The cylindrical rubbers 15 may be replaced by other members such as springs that applies urging force in the radial direction to the brush mechanism 11.

The above illustrated embodiments may be modified as follows.

The number of the second fixing position K2 and the number of the third fixing position K3 may be increased, respectively.

The angle formed by each of the positions K2, K3 and the position K1 about the central axis of the substrate 14 need not be 105° as long as the angle is within the range between 90° and 120°.

The cylindrical rubbers 15 may be replaced by resin members.

The present invention may be applied to a motor that has less than or more than four brushes.

Therefore, the present examples and embodiments are to be considered as illustrative and not restrictive and the invention is not to be limited to the details given herein, but may be modified within the scope and equivalence of the appended claims.

What is claimed is:

1. A supporting structure for a brush mechanism in a motor, wherein the brush mechanism includes a substrate, the substrate having a central axis, wherein a pair of electricity supply lines extend from the substrate, the supporting structure comprising:

a first support portion, a second support portion and a third support portion, the support portions being provided about the central axis of the substrate, wherein the first support portion is located between the electricity supply lines, and wherein the second and third support portions are respectively located on both sides of a straight line that extends through the first support portion and the central axis of the substrate; and a plurality of elastic members, each of which is located at one of the first to third support portions, wherein the substrate is supported by a housing of the motor with the elastic members, wherein the elastic members provided at the support portions are constantly compressed such that the elastic members urge the substrate radially inward.

2. The supporting structure according to claim 1, wherein the first to third support portions are angularly spaced at equal intervals about the central axis of the substrate.

3. A supporting structure for a brush mechanism in a motor, wherein the brush mechanism includes a substrate, the substrate having a central axis, wherein a pair of electricity supply lines extend from the substrate, the supporting structure comprising:

a first support portion, a second support portion and a third support portion, the support portions being provided about the central axis of the substrate, wherein the first support, portion is located between the electricity supply lines, and wherein the second and third support portions are respectively located on both sides of a straight line that extends through the first support portion and the central axis of the substrate;

a plurality of elastic members, each of which is located at one of the first to third support portions, wherein the substrate is supported by a housing of the motor with the elastic members, wherein the elastic members provided at the support portions are constantly compressed such that the elastic member, urge the substrate radially inward, wherein each elastic member has a contact portion, which contacts the substrate and has an arcuate cross-section, the central axes of the arcs of the contact portions being located on a first circle, the center of which coincides with the central axis of the substrate;

a plurality of fixing members attached to the housing, each fixing member corresponding to one of the elastic members, wherein each fixing member includes a central axis parallel to the central axis of the substrate and holds the corresponding elastic member by compressing the elastic member in the axial direction, wherein the central axes of the fixing members are located on a second circle, the center of which coincides with the central axis of the substrate; and a plurality of limiting members, each of which corresponds to one of the elastic members, wherein each limiting member limits the compressing force applied to the corresponding elastic member by the corresponding fixing member, wherein the diameter of the first circle and the diameter of the second circle are determined such that the compressed amount of each elastic member in the radical direction of the substrate is greater than the difference between the radius of the first circle and the radius of the second circle.

4. The supporting structure according to claim 3, wherein the second and third support portions are located at positions symmetrical with respect to the straight line.

5. The supporting structure according to claim 4, wherein each of the second and third support portions is angularly spaced from the first support portion by an angle in the range between 90° and 120° about the central axis of the substrate.

6. The supporting structure according claim 5, wherein the brush mechanism includes a plurality of brush boxes located about the central axis of the substrate, each brush box holding a brush, wherein a pair of the brush boxes are respectively located on both sides of the straight line at positions that are angularly spaced by 45° from the first support portion, and wherein another pair of the brush boxes are respectively located on both sides of the straight line at positions that are angularly spaced by 135° from the first support portion.

7. The supporting structure according to claim 3, wherein each of the second and third support portions is angularly spaced by an angle no more than 120° from the first support portion about the central axis of the substrate.

8. The supporting structure according to claim 3, wherein each of the second and third support portions is angularly spaced by an angle no less than 90° from the first support portion about the central axis of the substrate.

9. The supporting structure according to claim 3, wherein each limiting member is a cylindrical collar, and each elastic member is cylindrical and located about the collar, wherein each fixing member is inserted in the corresponding collar such that a space is created between the fixing member and the inner surface of the collar, and wherein the diameter of the first circle and the diameter of the second circle are determined such that the compression amount of each elastic member is greater than the space.

10. The supporting structure according to claim 9, wherein the diameter of the second circle is smaller than the diameter of the first circle.

11. The supporting structure according to claim 3, wherein the first to third support portions are angularly spaced at equal intervals about the central axis of the substrate.

12. A supporting structure for a brush mechanism in a motor, wherein the brush mechanism includes a substrate, the substrate having a central axis, wherein a pair of electricity supply lines extend from the substrate, the supporting structure comprising;

a first support portion, a second support portion and a third support portion, the support portions being provided about the central axis of the substrate, wherein the first support portion is located between the electricity supply lines, and wherein the second and third support portions are respectively located on both sides of a straight line that extends through the first support portion and the central axis of the substrate;

a plurality of elastic members, each of which is located at one of the first to third support portions, wherein the substrate is supported by a housing of the motor with the elastic members, wherein the elastic members provided at the support portions are constantly compressed such that the elastic members urge the substrate radially inward, wherein each elastic member has a contact portion which contacts the substrate and has an arcuate cross-section, the central axes of the arcs of the contact portions being located on a first circle, the center of which coincides with the central axis of the substrate;

a plurality of fixing members attached to the housing, each fixing member corresponding to one of the elastic members, wherein each fixing member holds the corresponding elastic member by compressing the elastic member in the direction of the central axis of the substrate; and a plurality of limiting members integrally formed with the housing, each limiting member corresponding to one of the elastic members, wherein each limiting member limits the compressing force applied to the corresponding elastic member by the corresponding fixing member, wherein each limiting member has an arcuate surface to which the corresponding elastic member is attached, and wherein the central axes of the arcuate surfaces of the limiting members are located on a second circle, the center of which coincides with the central axis of the substrate, wherein the diameter of the first circle and the diameter of the second circle are determined such that the compressed amount of each elastic member in the radial direction of the substrate is greater than the difference between the radius of the first circle and the radius of the second circle.

13. The supporting structure according to claim 12, wherein the diameter of the second circle is smaller than the diameter of the first circle.

14. The supporting structure according to claim 12, wherein the first to third support portions are angularly spaced at equal intervals about the central axis of the substrate.

15. A motor comprising:

a housing;

a brush mechanism including a substrate, the substrate having a central axis;

a pair of electricity supply lines extending from the substrate; and a first support portion, a second support portion and a third support portion, the support portions being provided about the central axis of the substrate, wherein the substrate is supported by the housing with a plurality of vibration absorbing members, each of which is located at one of the first to third support portions, wherein the first support portion is located between the electricity supply lines, and wherein the second and third support portions are symmetrically located on both sides of a straight line that extends through the first support portion and the central axis of the substrate, wherein the vibration absorbing members provided at the support portions are constantly compressed such that the vibration absorbing members urge the substrate radially inward.

16. The motor according to claim 15, wherein the first to third support portions are angularly spaced at equal intervals about the central axis of the substrate.

* * * * *

UNITED STATES PATENT AND TRADEMARK OFFICE
CERTIFICATE OF CORRECTION

PATENT NO. : 6,885,126 B2
DATED : April 26, 2005
INVENTOR(S) : Takahashi et al.

It is certified that error appears in the above-identified patent and that said Letters Patent is hereby corrected as shown below:

Column 7,
Line 54, delete "radical", and insert therefor -- radial --.

Signed and Sealed this

Fifth Day of July, 2005

JON W. DUDAS
*Director of the United States Patent and Trademark Office*